Jan. 18, 1927.

J. W. PRICE 1,615,134

FISH SCALING MACHINE

Filed Oct. 9, 1922    2 Sheets-Sheet 1

Inventor
James W. Price
By Lloyd W. Patch
his Attorney

Jan. 18, 1927.

J. W. PRICE

FISH SCALING MACHINE

Filed Oct. 9, 1922

Inventor
James W. Price
By Lloyd W. Gatch
his Attorney

Patented Jan. 18, 1927.

UNITED STATES PATENT OFFICE.

JAMES W. PRICE, OF BLOOMINGTON, INDIANA.

FISH-SCALING MACHINE.

Application filed October 9, 1922. Serial No. 593,265.

My present invention relates to fish-scaling machines, and particularly to a machine of this character adapted for market, hotel, and like uses where it is desired to expeditiously and thoroughly remove the scales from fish of different sizes.

An object of my invention is to provide a machine which will remove the scales from the body of a fish without tearing the skin or breaking or injuring the flesh, and which includes resilient or flexible scale removing portions adapted to conform to the shape of the body and thus insure a thorough cleaning.

A further object resides in so constructing the scale-removing portions that metal bristles or scaling fingers are moved over the body of the fish to catch behind and dislodge the scales, these bristles or fingers being sufficiently resilient to flex and conform to the shape of the body of the fish.

A still further object lies in mounting the bristles or scaling fingers upon a revolving drum whereby the fish can be moved back and forth and turned from one side to the other until every part has been brought in contact with the revolving brush structure, and in providing a guard structure to prevent the scales being scattered as they are removed.

With these and other objects in view, which will be apparent from the drawings, specification and claims, this invention includes certain novel features of construction and combinations of parts which will now be set forth.

Figure 1:
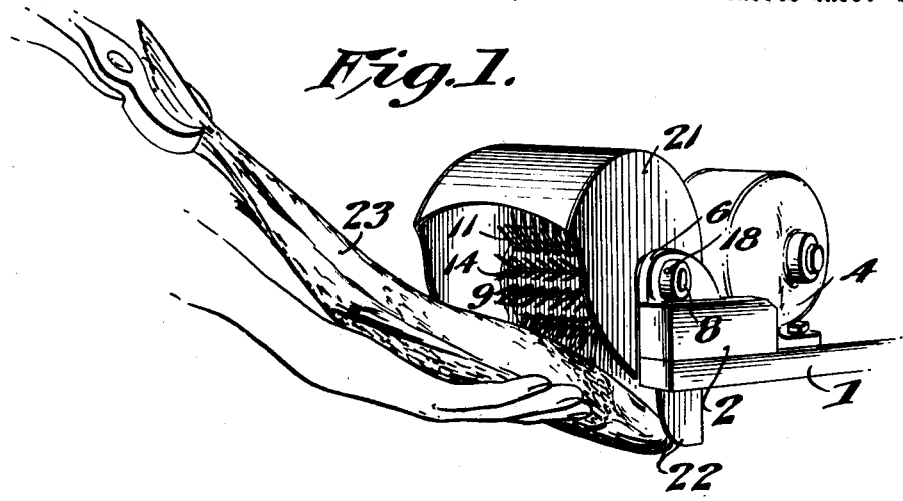
Figure 1 is a view in perspective showing my improved machine and illustrating the manner of using the same.

In the present instance I have shown my improved machine mounted upon a base or support 1, the supporting brackets 2 and 3 being mounted at one end of the base. A motor 4 adapted to receive current from any suitable source is mounted upon the base 1 at a point slightly separated from the supporting brackets 2 and 3, and is provided with a blade wheel 5, this motor being the source of power for a machine.

Figure 4:
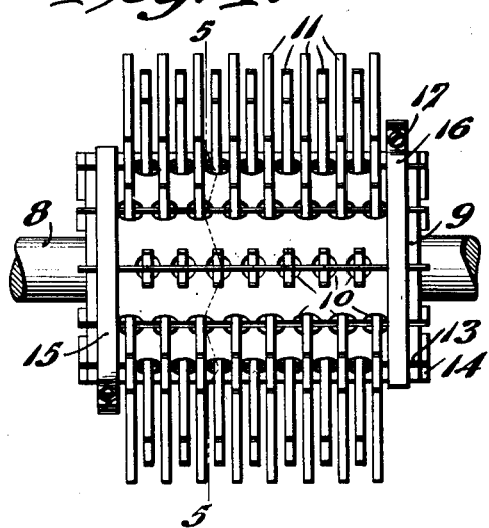
Fig. 4 is a view in elevation of the bristle-carrying head.
Figure 5:
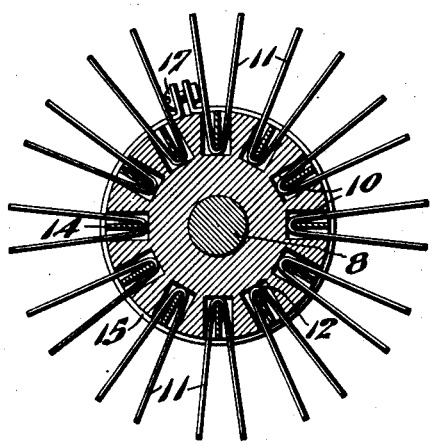
Fig. 5 is a sectional view on the line 5—5 of Fig. 4.
Figure 6:
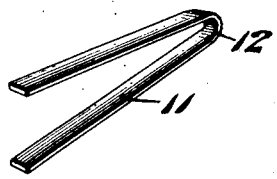
Fig. 6 is a view in perspective of one of the metal bristles or scaling fingers.
Figure 2:
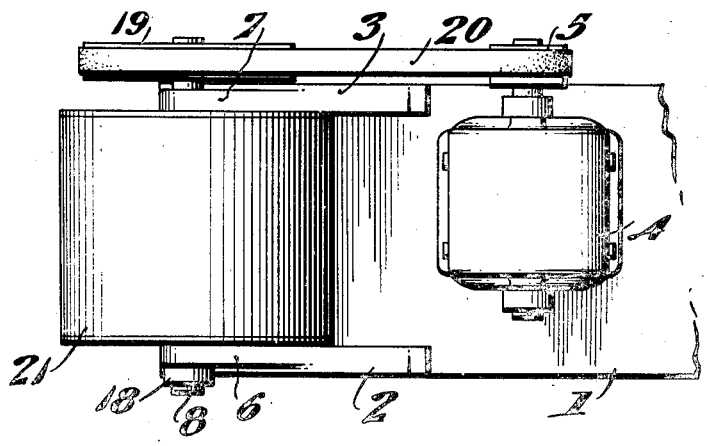
Fig. 2 is a top plan view of the structure.

Bearings 6 and 7 are mounted on the supporting brackets 2 and 3, and a shaft 8 is journaled in these bearings. This shaft has a cylindrical head 9 secured thereon between the bearings 6 and 7, and the head 9 is provided with rows of openings 10 bored or otherwise formed radially therein. The rows of openings are spaced around the periphery of the head 9, and alternate rows are preferably offset or staggered as shown in Fig. 4.

The metal bristles or scaling fingers 11 are fitted in the openings in the head 9 with their loop middle portions 12 bearing against the inner ends of the openings and their spring ends extending substantially radially from the head. The head 9 has the slots or kerfs 13 formed longitudinally thereof to intersect the rows of openings and retaining strips 14 are fitted in these slots or kerfs to engage with the loop portions 12 of the bristles or fingers and retain the same within the openings 10. These retaining strips 14 are secured in place by split rings 15 and 16 clamped upon the ends of the head 9 by clamp bolts 17.

Figure 3:
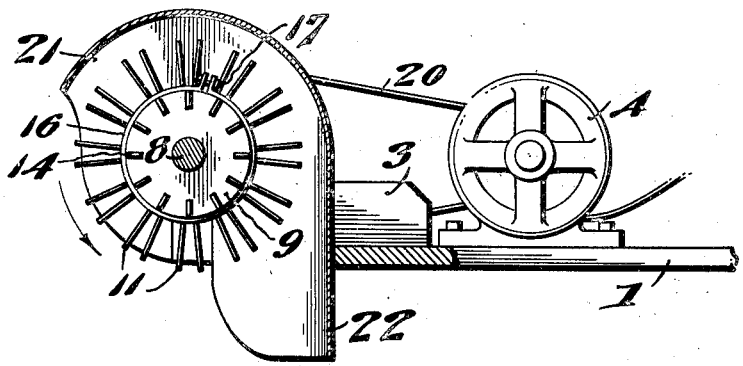
Fig. 3 is a view in side elevation with the scale guard shown in section to better illustrate the mount of the parts.

The shaft 8 has a collar 18 on one end to hold against longitudinal shifting and thus retain the head in the proper position between bearings 6 and 7, and at its remaining end the shaft has a belt wheel 19. A belt 20 is fitted over the wheel 19 and pulley 5, and when current is supplied to the motor 4, the scale-removing head is revolved in the direction indicated by the arrow in Fig. 3. A shield or hood 21 is fitted over the scale-removing head to give clearance thereon and is provided with an apron portion 22 to catch scales thrown downwardly by the bristles or fingers, the upper portion of the hood effectively preventing scales being thrown against the operator.

In the use of my improved machine, a fish, as indicated at 23 in Fig. 1, is supported in one hand of the operator and the tail is firmly held with the aid of a pair of pliers or otherwise by the remaining hand. The body of the fish is then brought up into contact with the revolving scale-removing head and the scales are pulled or otherwise removed from the fish by the contact of the metal bristles or fingers flexed to conform to the body of the fish and thus remove the scales from all portions, and due to their yielding contact will not tear the skin nor break or injure the meat of the fish under the skin. At the same time the reflexing of the bristles or fingers causes the scales to be thrown therefrom and when the scaling operation is completed all of the scales will have been removed from the fish. By arranging the rows of bristles or fingers in slightly offset or staggered relation, I assure a scaling contact with all portions of the body of the fish.

Should any of the metal bristles or scaling fingers 11 become broken or damaged the rings 15 and 16 are loosened and the retaining strip 14 holding the damaged parts is removed to permit replacement. In this way one or several of the bristles or fingers can be renewed in the cylindrical head, when occasion requires.

While in the foregoing, I have described only certain specific embodiments, it will be appreciated that in practice I might resort to a number of modifications and changes, without departing from the spirit and scope of my invention as defined in the appended claims.

I claim:

1. A fish-scaling machine comprising, with a shaft, a cylindrical scaling head fixed on the shaft and having a plurality of transversely aligned radial openings formed in the periphery thereof, a plurality of substantially U-shaped spring metal scaling fingers fitted resiliently in said openings with their ends extending substantially radially from the head, and means to retain the scaling fingers in place.

2. A fish-scaling machine comprising, with a shaft, a cylindrical scaling head fixed on said shaft provided with a plurality of transversely aligned radially extending openings in its periphery and having longitudinal slots cut through said openings, a plurality of substantially U-shaped flexible scaling fingers fitted with their U-shaped portions resiliently held in said openings, retaining bars fitted in the slots to engage said scaling fingers, clamp rings on the ends of the head to secure the retaining bars in place, and means to revolve said shaft.

3. A fish-scaling machine comprising, with a shaft, a cylindrical scaling head fixed on said shaft provided with a plurality of transversely aligned radially extending openings in its periphery and having longitudinal slots cut through said openings, a plurality of substantially U-shaped resilient scaling fingers fitted with their U-shaped portions in said openings, retaining bars fitted in the slots to engage said scaling fingers, clamp rings on the ends of the head to secure the retaining bars in place, and bearings in which said shaft is revolubly mounted, power means to revolve the shaft and consequently the head, and a hood disposed over the scaling head.

In testimony whereof I hereunto affix my signature.

JAMES W. PRICE.